(12) United States Patent
Palfenier et al.

(10) Patent No.: US 6,392,406 B1
(45) Date of Patent: May 21, 2002

(54) ADJUSTABLE LENGTH VEHICLE SPEED SENSOR

(75) Inventors: Samuel Roland Palfenier, El Paso, TX (US); Aaron T. Gibson, Rochester Hills, MI (US); Mark Anthony Shost, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/455,898

(22) Filed: Dec. 6, 1999

(51) Int. Cl.[7] .............................. G01P 3/48; G01P 3/488
(52) U.S. Cl. .................................. 324/174; 324/207.15
(58) Field of Search .................................. 324/160, 166, 324/173, 174, 207.2, 207.21, 207.22, 207.23, 207.25, 207.15, 207.16

(56) References Cited

U.S. PATENT DOCUMENTS

| | | | | |
|---|---|---|---|---|
| 5,132,616 A | * | 7/1992 | Vignotto | 324/174 |
| 5,381,089 A | * | 1/1995 | Dickmeyer et al. | 324/174 |
| 5,631,556 A | * | 5/1997 | Shibata | 324/174 |
| 5,956,544 A | * | 9/1999 | Stern et al. | 399/73 |
| 5,988,806 A | * | 11/1999 | Hall et al. | 347/92 |
| 6,205,858 B1 | * | 3/2001 | Palfenier et al. | 73/514.39 |

* cited by examiner

Primary Examiner—Edward Lefkowitz
Assistant Examiner—Reena Aurora
(74) Attorney, Agent, or Firm—Margaret A. Dobrowitsky

(57) ABSTRACT

A vehicle speed sensor includes a hollow generally cylindrical sensor housing (102) with an open proximal end (112). Within the interior of the sensor housing (102) is a sensing structure and coupled to the open proximal end (112) of the sensor housing (102) is a connector housing (134). The connector housing (134) forms an engagement groove (146) and the sensor housing forms an engagement rib (148). To establish a desired sensor length, the sensor housing (102) is slid relative to the connector housing (134). The engagement rib (148) is then heat staked to the groove (146).

20 Claims, 1 Drawing Sheet

ADJUSTABLE LENGTH VEHICLE SPEED SENSOR

TECHNICAL FIELD

The present invention relates generally to motor vehicle speed sensors.

BACKGROUND OF THE INVENTION

Transmission-mounted vehicle speed sensors have been provided to sense the speed of a vehicle. Typical transmission speed sensors have a one-piece external housing that is molded around an internal sensing structure. The high temperatures associated with the molding process can have detrimental effects on the sensing structure and affect long term performance. Moreover, many vehicles have sensors of different lengths. To accommodate the different lengths, the internal parts must be different. As such, there is a lack of standardization of parts which increases manufacturing costs.

As such, the present invention recognizes the need for a speed sensor that eliminates the exposure of internal components to high molding temperatures during manufacture. There is also a need for a speed sensor that uses standard-sized parts regardless of its length.

SUMMARY OF THE INVENTION

A vehicle speed sensor includes a sensor housing that has an open end, a sensing structure within the sensor housing, and a connector housing that is installed in the open end of the sensor housing. As envisioned in the particularly preferred embodiment set forth in detail below, the connector housing is formed with at least one engagement groove and the sensor housing is formed with at least one engagement rib coupled to the groove. Prior to coupling, to establish a predetermined length of the sensor, the connector housing (134) is slidable relative to the sensor housing. Once the length is established, the rib is heat staked to the groove.

Preferably, the connector housing also forms at least one o-ring groove and the vehicle speed sensor has an o-ring disposed within the o-ring groove to establish a seal between the sensor housing and the connector housing. Additionally, the sensing structure has a spool with a pole piece holder that supports a pole piece and a coil that is disposed around the pole piece. Moreover, the vehicle speed sensor has a connector supported by the connector housing, and the connector is electrically connected to the coil.

In a preferred embodiment, the connector housing forms a socket around the connector and the socket is sized to engage a complementarily-shaped and sized electrical connector. Also, the connector housing defines a first axis and the sensor housing defines a second axis that is orthogonal to the first axis. In order to be properly positioned in a transmission housing, the sensor housing has an outer wall that further has an abutment flange that can abut a transmission housing.

As described further below, the vehicle speed sensor can be inserted into a vehicle transmission fluid so that the pole piece contacts the transmission fluid. The sensing structure further has at least one magnet magnetically coupled to the pole piece, and the coil surrounds at least a portion of the pole piece. The spool holds the magnet and the pole piece and is disposed between the coil and the pole piece.

In another aspect of the present invention, a vehicle speed sensor has a sensor housing with an open end, and the sensor housing forms at least one engagement rib. A sensing structure is disposed within the sensor housing. Additionally, a connector housing is coupled to the open end of the sensor housing. At least one engagement groove is formed in the connector housing. As discussed below, the groove receives the engagement rib and the two are heat-staked together to bond the sensor housing to the connector housing.

BRIEF DESCRIPTION OF THE DRAWINGS

The novel features of this invention, as well as the invention itself, both as to its structure and its operation, will be best understood from the accompanying drawings, taken in conjunction with the accompanying description, in which reference characters refer to similar part, and in which.

DESCRIPTION OF AN EMBODIMENT OF THE INVENTION

Figure 1:
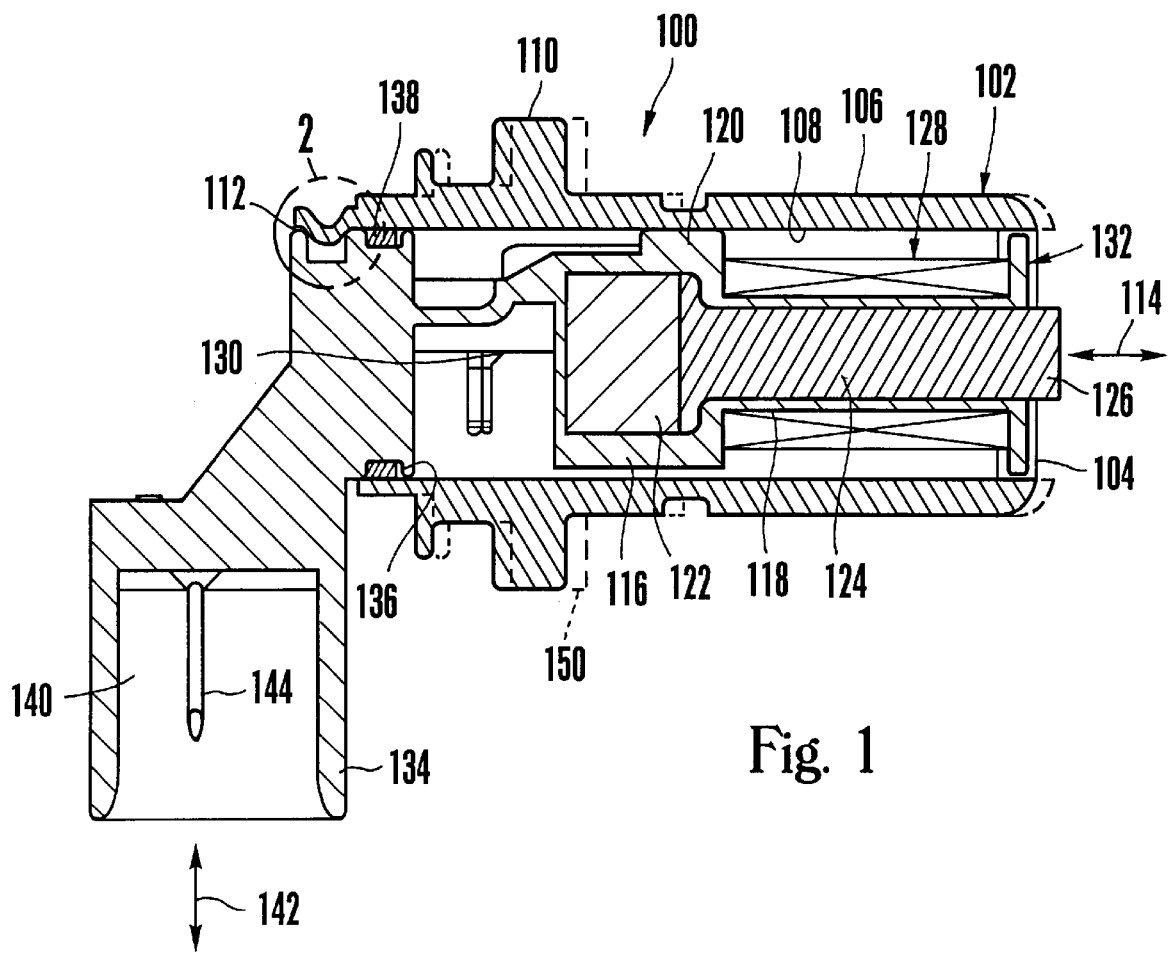
FIG. 1 a cross-sectional view of the sensor after the sensor housing has been heat-staked to the connector housing.

Referring initially to FIG. 1, a vehicle speed sensor is shown and generally designated 100. The speed sensor 100 includes a metal, or more preferably, a plastic hollow generally cylindrical sensor housing 102 having an open distal end 104. The sensor housing 102 defines an outer wall 106 and an interior surface 108, and an abutment flange 110 is formed on the outer wall 106 to abut a transmission housing, with the open distal end 104 being disposed within the transmission housing in contact with transmission fluid. Opposite the open distal end 104, the sensor housing 102 is formed with an open proximal end 112, with a sensor housing axis 114 being defined between the ends 104, 112.

As shown in FIG. 1, a hollow plastic generally "T"-shaped spool 116 is disposed within the sensor housing 102. As shown, the spool 116 includes a hollow cylindrical pole piece holder 118 that terminates at its proximal end in an enlarged magnet holder 120. Preferably, the pole piece holder 118 is integrally formed with the connector housing, discussed below. Sensing structure, including a magnet 122, fills the magnet holder 120 and an elongated pole piece 124 fills the pole piece holder 118 as shown. The magnet 122 is magnetically coupled to the pole piece 124, and the magnet 122 preferably contacts the pole piece 124. If desired, a distal segment 126 of the pole piece 124 can extend beyond the distal end 104 of the sensor housing 102.

FIG. 1 also shows that the sensing structure of the sensor 100 includes a hollow toroidal coil 128 of wire that closely surrounds the pole piece holder 118 of the spool 116. The coil 128 is magnetically coupled to the pole piece 124/magnet 122. One or more electrical leads connect the coil 128 to terminals 130. Additionally, a hollow disk-shaped sealing ring 132 extends radially outward from the distal end of the pole piece holder 118 with the coil 128 being ensconced behind (i.e., proximal) to the sealing ring 132, and thus, protected from transmission fluid. With this structure, the pole piece 124 can be, e.g., coupled to a rotating component of a vehicle transmission, with an electric current that is representative of the speed of rotation accordingly being generated in the coil 128.

Additionally, a metal, or more preferably, a plastic connector housing 134 is coupled to the sensor housing 102. In a preferred embodiment, the connector housing is held within the proximal end 112 of the sensor housing 102 as shown. If desired, the connector housing 134 can be circumscribed by an o-ring groove 136, and an o-ring 138 can be disposed within the groove 136 to establish a seal between the housings 102, 134.

Still referring to FIG. 1, the connector housing 134 defines a hollow socket 140, and the socket 140 establishes an axis 142 that is orthogonal to the axis 114 of the sensor housing 102. One or more connectors, such as a pin 144, are supported within the socket 140, it being understood that the pin 144 is electrically connected to the terminals 130 and hence, to the coil 128. The socket 140 is configured for engaging a complementarily-shaped connector (not shown) of a vehicle instrumentation system, for receiving the signal from the coil 128.

Figure 2:
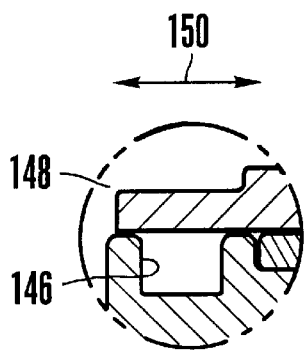
FIG. 2 is a detail view as would be seen as indicated by the circle 2 in FIG. 1, prior to heat staking.
Figure 3:
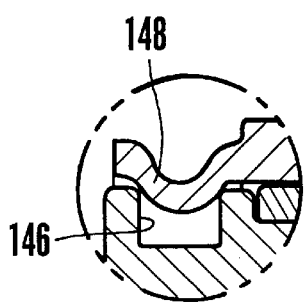
FIG. 3 is a detail view as seen as indicated by the circle 2 in FIG. 1.

Having described the overall structure of the sensor 100, attention is now directed to FIGS. 2 and 3, which show the details of the union between the sensor housing 102 and the connector housing 134. The connector housing 134 is formed with an engagement groove 146 and the sensor housing 102 is formed with an engagement rib 148. Prior to heat staking (i.e., while in the configuration shown in FIG. 2), the length of the sensor (specifically, the distance between the abutment flange 110 and the distal end of the pole piece 124) is established by appropriately displacing the sensor housing 102 relative to the connector housing 134 in the dimension indicated by the arrows 150 in FIG. 2. Then, once the length of the sensor has been established as desired, the rib 148 is heat-staked to the groove 146, causing the rib to assume the inwardly-curved shape shown in FIG. 3. Thus, at the junction of the groove 146 and the engagement rib 148 the housings 102, 134 are heat-staked together to hold the housings 102, 134 together. In another embodiment, the groove can be formed in the sensor housing 102 and the engagement rib of the present invention can be formed on the connector housing 134.

By having a sensor housing 102 that is molded separately and then installed over the sensing structure, the coil 128 and other components of the sensing structure are not exposed to the damaging high temperatures that are associated with a continuous connector/sensor housing molded in one-piece. It can be appreciated that the present design can also accommodate sensing structures of different lengths by displacing the abutment flange 110 with respect to the distal segment 126 of the pole piece 124 as described above, and then heat staking the two together when the desired length is established. This increases the standardization of parts and helps reduce manufacturing costs.

While the particular vehicle speed sensor as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A vehicle speed sensor comprising:
   a sensor housing having an open end;
   a sensing structure disposed within the sensor housing; and
   a connector housing coupled to the open end of the sensor housing, the connector housing being slidable relative to the sensor housing prior to coupling to one of at least two final positions, wherein the length of the sensor can be established as one of at least two lengths.

2. The vehicle speed sensor of claim 1, wherein the connector housing (134) is formed with at least one engagement groove (146) and the sensor housing (102) is formed with at least one engagement rib (148) received in the groove (146) and heat-staked thereto to hold the housings (102, 134) together.

3. The vehicle speed sensor of claim 2, wherein the connector housing (134) is formed with at least one o-ring groove (136) and the vehicle speed sensor (100) further includes an o-ring (138) disposed within the o-ring groove (136) to establish a seal between the sensor housing (102) and the connector housing (134).

4. The vehicle speed sensor of claim 1, wherein the sensing structure includes a spool (116) having a pole piece holder (118) supporting a pole piece (124) and a coil (128) disposed around the pole piece (124).

5. The vehicle speed sensor of claim 4, further including a connector (144) supported by the connector housing (134), the connector (144) being electrically coupled to the coil (128).

6. The vehicle speed sensor of claim 5, wherein the connector housing (134) forms a socket (140) around the connector (144), the socket (140) being sized to engage a complementarily-shaped and sized electrical connector.

7. The vehicle speed sensor of claim 5, wherein the vehicle speed sensor is positionable within a vehicle transmission fluid such that the pole piece (124) contacts the transmission fluid and the sensing structure further includes:
   at least one magnet (122) magnetically coupled to the pole piece (124) wherein the coil (128) surrounds at least a portion of the pole piece (124) and the spool (116) holds at least the magnet (122) and the pole piece (124).

8. The vehicle speed sensor of claim 7, wherein the spool (116) is disposed between the coil (128) and the pole piece (124).

9. The vehicle speed sensor of claim 1, wherein the connector housing (134) defines a first axis (142) and the sensor housing (102) defines a second axis (114), the axes (114, 142) being orthogonal to each other.

10. The vehicle speed sensor of claim 1, wherein the sensor housing (102) further includes an outer wall (106) having an abutment flange (110) to abut a transmission housing.

11. A vehicle speed sensor comprising:
    a sensor housing (102) having an open end (104), the sensor housing (102) formed with at least one engagement rib (148);
    a sensing structure disposed within the sensor housing (102); and a connector housing (134) coupled to the open end (104) of the sensor housing (102), the connector housing (134) formed with at least one engagement groove (146), the engagement rib (148) being heat-staked to the groove (146) to hold the sensor housing (102) and the connector housing (134) together.

12. The vehicle speed sensor of claim 11, wherein the connector housing (134) is formed with at least one o-ring groove (136) and the vehicle speed sensor (100) further includes an o-ring (138) disposed within the o-ring groove (136) to establish a seal between the sensor housing (102) and the connector housing (134).

13. The vehicle speed sensor of claim 11, wherein the sensing structure includes a spool (116) having a pole piece holder (118) supporting a pole piece (124), a coil (128) being disposed around the pole piece (124).

14. The vehicle speed sensor of claim 13, further including a connector (144) supported by the connector housing (134), the connector (144) being electrically coupled to the coil (128).

15. The vehicle speed sensor of claim 14, wherein the connector housing (134) forms a socket (140) around the connector (144), the socket (140) being sized to engage a complementarily-shaped and sized electrical connector.

16. The vehicle speed sensor of claim 13, wherein the vehicle speed sensor (100) is insertable into a vehicle transmission fluid such that the pole piece (124) contacts the transmission fluid and the sensing structure further includes:

at least one magnet (122) magnetically coupled to the pole piece (124) wherein the coil (128) surrounds at least a portion of the pole piece (124) and the spool (116) holds at least the magnet (122) and the pole piece (124).

17. The vehicle speed sensor of claim 16, wherein the spool (116) is disposed between the coil (128) and the pole piece (124).

18. The vehicle speed sensor of claim 11, wherein the connector housing (134) defines a first axis (142) and the sensor housing (102) defines a second axis (114), the axes (114, 142) being orthogonal to each other.

19. The vehicle speed sensor of claim 11, wherein the sensor housing (102) further includes an outer wall (106) having an abutment flange (110) to abut the transmission housing.

20. A method for providing a vehicle speed sensor, comprising the acts of: providing a sensor housing having an open end;

disposing a sensing structure in the housing;

coupling a connector housing to the open end of the sensor housing;

sliding the housings relative to each other to one of a plurality of final positions; and affixing the housings together after the sliding act.

* * * * *